(12) United States Patent
Keul et al.

(10) Patent No.: US 8,719,468 B2
(45) Date of Patent: May 6, 2014

(54) WIRELESS FIELDBUS MANAGEMENT

(75) Inventors: Thomas Keul, Freigericht (DE); Ralf Huck, Grosskrotzenburg (DE)

(73) Assignee: ABB AG, Mannheim (DE)

( * ) Notice: Subject to any disclaimer, the term of this patent is extended or adjusted under 35 U.S.C. 154(b) by 55 days.

(21) Appl. No.: 12/161,607

(22) PCT Filed: Jan. 23, 2007

(86) PCT No.: PCT/EP2007/000528
§ 371 (c)(1),
(2), (4) Date: Nov. 13, 2008

(87) PCT Pub. No.: WO2007/082773
PCT Pub. Date: Jul. 26, 2007

(65) Prior Publication Data
US 2009/0100202 A1    Apr. 16, 2009

(30) Foreign Application Priority Data

Jan. 23, 2006  (DE) .......................... 10 2006 003 008
Jan. 22, 2007  (DE) .......................... 10 2007 003 196

(51) Int. Cl.
*G06F 3/00*    (2006.01)

(52) U.S. Cl.
USPC ........... 710/38; 710/8; 700/1; 700/19; 700/20

(58) Field of Classification Search
None
See application file for complete search history.

(56) References Cited

U.S. PATENT DOCUMENTS

| | | | |
|---|---|---|---|
| 5,978,578 A * | 11/1999 | Azarya et al. .................. 717/100 |
| 5,980,078 A * | 11/1999 | Krivoshein et al. ................ 700/1 |
| 6,098,116 A * | 8/2000 | Nixon et al. ....................... 710/8 |
| 7,010,294 B1 * | 3/2006 | Pyotsia et al. ................. 455/420 |
| 7,058,542 B2 * | 6/2006 | Hauhia et al. ................... 702/183 |
| 7,079,984 B2 * | 7/2006 | Eryurek et al. ................ 702/185 |
| 7,389,204 B2 * | 6/2008 | Eryurek et al. ................ 702/188 |
| 7,460,865 B2 * | 12/2008 | Nixon et al. ................... 455/428 |
| 7,676,287 B2 * | 3/2010 | Eryurek et al. .................. 700/83 |
| 2003/0043052 A1 * | 3/2003 | Tapperson et al. ........ 340/825.37 |
| 2003/0179778 A1 * | 9/2003 | Guanter et al. ............... 370/503 |
| 2003/0236579 A1 * | 12/2003 | Hauhia et al. ................... 700/79 |
| 2004/0111238 A1 * | 6/2004 | Kantzes et al. ............... 702/183 |
| 2004/0259533 A1 * | 12/2004 | Nixon et al. ................ 455/414.1 |
| 2005/0130605 A1 | 6/2005 | Karschnia et al. |
| 2005/0164684 A1 * | 7/2005 | Chen et al. ................. 455/414.1 |

(Continued)

FOREIGN PATENT DOCUMENTS

DE    10314721 A1 * 11/2004
EP    0 940 738 A2    9/1999

OTHER PUBLICATIONS

International Preliminary Report on Patentability, including English language translation of Written Opinion of the International Searching Authority, issued Oct. 14, 2008.

(Continued)

*Primary Examiner* — Steven Snyder
(74) *Attorney, Agent, or Firm* — Buchanan Ingersoll & Rooney PC

(57) ABSTRACT

The invention relates to a communication system for interchanging data in an automation system for communication between central and peripheral devices. A converter is connected into the communication path between the central devices and peripheral devices and being designed for line-bound communication with the central device and for wireless communication with the peripheral devices.

6 Claims, 1 Drawing Sheet

(56) References Cited

U.S. PATENT DOCUMENTS

| | | | |
|---|---|---|---|
| 2005/0245291 A1* | 11/2005 | Brown et al. | 455/572 |
| 2006/0040667 A9* | 2/2006 | Coppinger et al. | 455/436 |
| 2006/0120316 A1* | 6/2006 | Von Stein et al. | 370/315 |
| 2006/0161393 A1* | 7/2006 | Zielinski et al. | 702/184 |
| 2006/0267792 A1* | 11/2006 | Schnaare et al. | 340/870.1 |
| 2007/0161352 A1* | 7/2007 | Dobrowski et al. | 455/69 |
| 2007/0220131 A1* | 9/2007 | Ozawa et al. | 709/223 |
| 2007/0229255 A1* | 10/2007 | Loechner | 340/540 |
| 2007/0237137 A1* | 10/2007 | McLaughlin | 370/389 |
| 2007/0244584 A1* | 10/2007 | John et al. | 700/86 |
| 2007/0270177 A1* | 11/2007 | Nagashima et al. | 455/550.1 |
| 2007/0280144 A1* | 12/2007 | Hodson et al. | 370/312 |
| 2008/0162738 A1* | 7/2008 | Apel et al. | 710/11 |
| 2008/0234837 A1* | 9/2008 | Samudrala et al. | 700/19 |
| 2008/0273486 A1* | 11/2008 | Pratt et al. | 370/328 |
| 2009/0138104 A1* | 5/2009 | Huck | 700/75 |

OTHER PUBLICATIONS

"H.I.S. Hart Interface Solutions", Process Automation Brochure, Pepperl+Fuchs Co., pp. 1-20. Jun. 2001.

Willig, Andreas, "Wireless Sensor Network." Technologie, Mar. 16, 2005, pp. 1-18 (translation of "Das drahtlose Sensornetz").

* cited by examiner

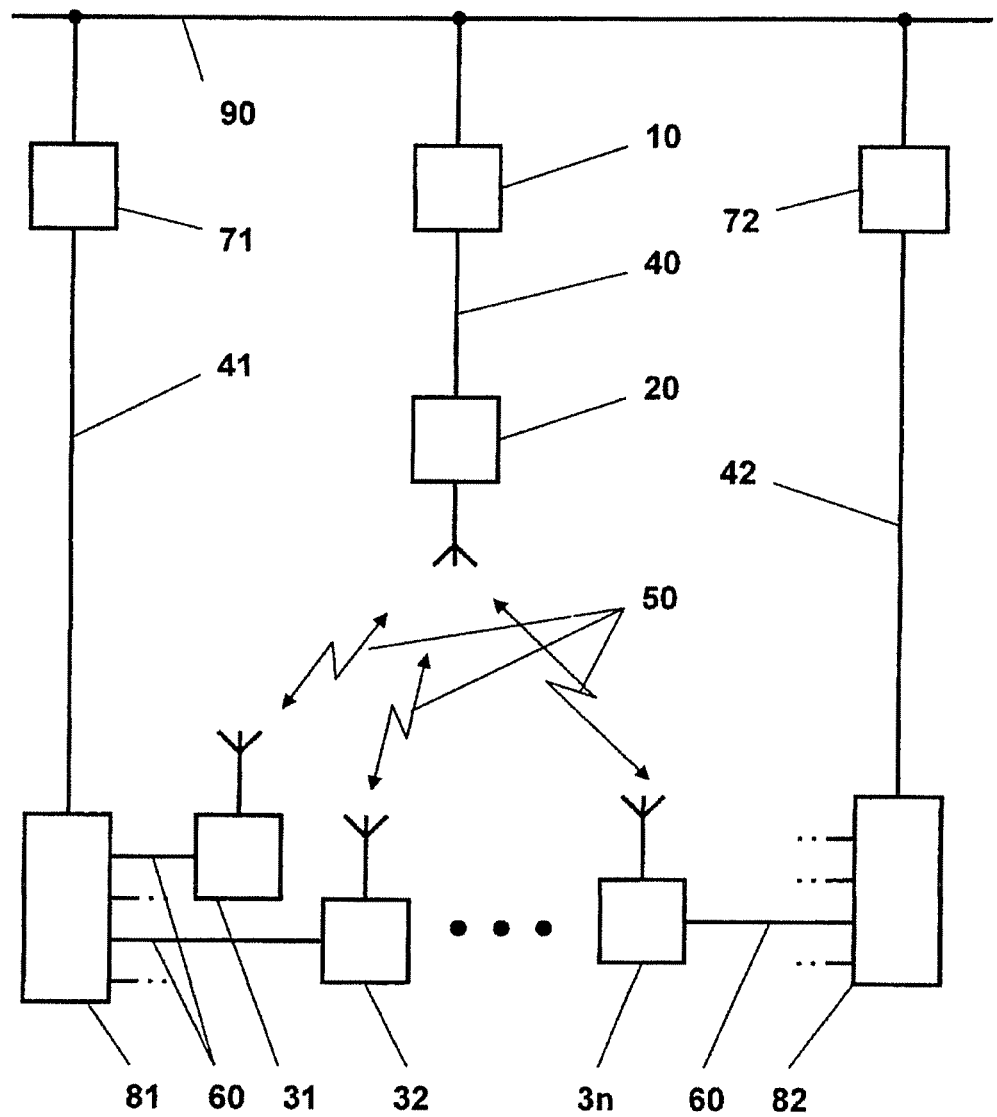

WIRELESS FIELDBUS MANAGEMENT

BACKGROUND

The invention relates to a communication system for data interchange in a technical automation installation for communication between central and peripheral devices.

It is known for so-called fieldbus systems to be used for communication purposes at the field level in a technical automation installation. In field bus systems, the measured values are digitized in the field device or in local I/O assemblies, and then supplied via a field bus network to a higher-level controller. At least one communication link and the feed for the assembly are required for this purpose.

There are bus systems in which the feed and communication can take place via one and the same pair of conductors (for example PROFIBS PA, Foundation Field Bus).

Because of the network structure, all the field devices are galvanically connected to the field bus network. A disturbance affecting only one subscriber therefore affects the entire network. Data transmission is therefore likewise no longer possible for all the other subscribers, or is subject at least to considerable interference. In the extreme, the disturbance can lead to considerable, irreparable damage. Typical disturbances in technical process installations include in particular shorts, line discontinuities, electromagnetic interference and lightning strikes.

Furthermore, deliberate actions by the operator on a technical automation component can also be regarded as disturbances. These actions are, for example, required for maintenance purposes and in this case always represent a risk to the continuous operation of an installation that is required in the process industry. This includes, in particular, upgrades to the functional scope of a technical automation installation, for example as required for integration of installation management systems.

Installation management systems such as these are used to gather and process information relating to the status of the peripheral appliances. The central controller for a technical automation installation is designed primarily for processing process values, and is also unsuitable for obtaining and producing information such as this from peripheral appliances which are connected in an analogous form via a 0/4 . . . 20 mA interface. This relates in the same manner to process controllers with analogue information transmission and superimposed HART communication, in which the input/output assemblies are not suitable for connection of the peripheral appliances for HART communication, as well as a field bus system without acyclic services. In these process controllers, the information required for installation management is not available in the central controller and is therefore not accessible by a higher-level installation management system.

It is known from the publication "H.I.S. HART INTERFACE SOLUTIONS", Part. No. 475215, from the Pepperl+Fuchs Company for so-called multiplexer solutions to be used to provide the asset management information for HART-compatible appliances. These multiplexer solutions are installed in the communication path, in order to pass the desired information beyond the central controller. However, retrospective installation is a significant action which virtually always leads to connection of the installation. Actions such as these in the structure of the communication path are often also undesirable because they are associated with a large amount of documentation and test effort or because the space for the additionally required components along the communication path is not available, or its provision would be extremely costly.

A further disadvantage of multiplexer solutions is the frequently undesirable coupling between installation topology and the installation management topology. For example, it is normally impracticable to use only individual signals to provide the installation management information with one multiplexer, since the wiring of the multiplexers follows the normal eight-channel or sixteen-channel implementation of an input/output assembly. This disadvantage also applies to input/output assemblies for connection of the peripheral appliances which are suitable for HART communication, and to fieldbus systems with acyclic service support.

The article "Das drahtlose Sensornetzwek" [The wireless sensor network], published in the 2005 Sensor Guide in Computer & AUTOMATION, pages 14 to 18, discloses sensor signals being transmitted without the use of wires and possibly via a plurality of sensor nodes. The process values are disadvantageously no longer available in analogue form or as a bus signal. In this case, however, cable supply lines are still required for the power supply. The alternative power supply using batteries or solar cells requires a very large amount of maintenance effort and/or is dependent on the weather, and is therefore unacceptable to operators of technical automation installations.

Furthermore, bus systems are known in which optical waveguide paths or radio links are used for signal transmission between two devices connected on a 1:1 basis. The assemblies which are distributed in the panel are still connected conventionally via galvanically coupled bus networks.

SUMMARY

The invention is based on the object of specifying a communication system in which a central station is connected to a plurality of fieldbus subscribers without in this case having to be directly connected to them, in a galvanically coupled form.

According to the invention, this object is achieved by the means in patent claim 1. Advantageous refinements of the invention are specified in the claims which refer back to it.

The invention is based on a technical automation installation having a plurality of peripheral devices which are connected for communication purposes to a central control device. In this case, measured values and diagnostic data are transmitted from the peripheral devices to the central control device, and manipulated values as well as parameters are communicated from the central control device to the peripheral devices.

The essence of the invention is a converter which is connected in the communication path and has a predeterminable number of clearly associated peripheral devices. The converter is designed for wireless communication with the peripheral devices associated with it. The communication connection between the converter and the central device is in contrast cable-based.

The communication system according to the invention is designed for process control in addition to an existing, cable-based communication network, and complements this, while avoiding the disadvantages mentioned above.

This advantageously means that the effect of the disturbances mentioned initially from a peripheral device on this unit remains limited, therefore avoiding other peripheral devices also suffering sympathetically as a result of this disturbance.

Furthermore, the restriction to the peripheral device means that the cable-based communication network for process control and the communication system according to the invention are logically different and can be decoupled from one another, so that mutually different granularity of the two communication systems is possible for planning and commissioning. Access to the installation management information can be limited to a predeterminable number or to a predeterminable category of peripheral appliances.

The communication system according to the invention advantageously allows central access to peripherals in logically different bus systems, which can also be associated with different control systems.

Furthermore, this avoids the need for additional space in the switching area, since the component required to carry out the teaching according to the invention are mounted locally, in the vicinity of the peripheral.

The communication system according to the invention advantageously avoids effects on the central controller since the information transmitted via it bypasses the central controller. This allows even complex upgrades to be carried out on the technical automation installation without having to shut the installation down.

Power is supplied to the devices in the wireless communication path via the cable-based communication network for process control. There is advantageously no need for additional wiring, or solar cells to supply power to the peripheral devices.

The parallel installation management system also has access to the process values, so that they are also available in a redundant form for process control in the event of a defect in or disturbance to the cable-based communication network.

Furthermore, the number of complex galvanic isolation points is restricted to the necessary minimum for transmission of the process values.

BRIEF DESCRIPTION OF THE DRAWING FIGURES

The invention will be explained in the following text with reference to one exemplary embodiment. The single FIGURE shows the basic design of a structure of a communication system.

DETAILED DESCRIPTION OF EXEMPLARY EMBODIMENTS

A converter 20 has precisely n clearly associated peripheral devices 31 to 3n. The peripheral devices 31 to 3n and the converter 20 have a transmitting and receiving device by means of which they can interchange their data without the use of wires. In one preferred refinement of the invention, the data is interchanged by radio.

In a first refinement of the invention, the peripheral devices 31 to 3n are field devices. In this case, in one preferred embodiment, selected peripheral devices 31 and 32 are associated as field devices with a first process controller 71, and further peripheral devices 3n are associated with a second process controller 72, which is independent of the first. In the illustration in the figures, the devices 31 to 3n are analogue field devices, which are individually connected via a conventional installation wiring 60 and via a current loop to an input/output assembly 81 or 82 associated with the respective process controller 71 or 72. The process controllers 71 and 72 are respectively connected to the input/output assemblies 81 and 82 via individual cable-based respective communication links 41 and 42.

The converter 20 is connected to a central device 10 via a cable-based communication link 40. In one preferred refinement of the invention, the cable-based communication link 40 is a conventional wire link. In an alternative refinement of the invention, an optical waveguide link may be provided as the cable-based communication link 40.

Status data for the peripheral devices 31 to 3n for different process controllers 71 and 72 for installation management is gathered and evaluated in the central device 10. The communication system for installation management is in this case superimposed thereon, independently of the communication systems for controlling the technical process.

A further refinement of the invention allows the communication system for installation management and the communication systems for controlling the technical process to be connected to one another. For this purpose, the process controllers 71 and 72 and the central device 10 are connected to a common system bus 90.

The converter 20 passes the input values received from the panel to the central device 10, and sends the output values received from the central device 10 to the peripheral devices 31 to 3n.

This bidirectional communication is also used for configuration of the peripheral devices 31 to 3n. The converter 20 for this purpose sends the data that is available from the central device 10 to the peripheral devices 31 to 3n associated with it. The data is then processed in the peripheral devices 31 to 3n in a manner that is known per se.

Physically, each peripheral device 31 to 3n has an associated wireless communication component. In one embodiment of the invention, the wireless communication component is inserted as a separate device into the current loop leading to the peripheral device 31 to 3n. In this case, the wireless communication component is fed from the current loop.

An alternating current is modulated onto the feeding direct current for communication between the separate wireless communication components and the peripheral devices 31 to 3n. A protocol based on the HART specification is particularly suitable for this purpose. This embodiment is advantageously particularly suitable for retrospective upgrading of existing technical automation installations with means for installation management. In this case, the action is in each case locally restricted to one peripheral device 31 to 3n.

An alternative embodiment of the invention provides for the wireless communication component to be a supplementary module. The peripheral devices 31 to 3n are equipped with a holding apparatus for optional supplementary modules. The wireless communication component is supplied to the holding apparatus, and is fed from the peripheral device 31 to 3n. For example, a local indication module may be replaced by a communication module. In this case, the cable-based communication network of the conventional installation wiring 60 advantageously remains unaffected.

In one alternative embodiment, input/output assemblies 81, 82 may also be provided as peripheral devices 31 to 3n. In this case, the process values are transmitted between the field devices and the input/output assemblies 81, 82 via analogue current loops, onto which an alternating-current signal is modulated in order to transmit installation management information. A protocol according to the HART specification is particularly suitable for this purpose. The installation management information is converted in the input/output assemblies 81, 82 between the cable-based alternating-current transmission and the wireless transmission, and is interchanged with the central device 10 via the wireless communication link 50 and the converter 20.

This embodiment makes it possible to overcome manufacturer-specific incompatibilities in the communication between the input/output assemblies 81, 82 and the process controllers 71 and 72 for transmission of installation management information.

Furthermore, this embodiment can also advantageously be used when the field devices are connected via a fieldbus and are suitable for digital communication via the fieldbus.

LIST OF REFERENCE SYMBOLS

10 Central device
20 Converter
31 to 3*n* Peripheral device
40, 41, 42 Cable-based communication link
50 Wireless communication link
60 Conventional installation wiring
71, 72 Process control
81, 82 Input/output assembly
90 System bus

The invention claimed is:

1. A communication system for data interchange in a technical automation installation for communication between central and peripheral devices, the communication system comprising:
a converter configured to receive input values from a panel;
a central device configured to receive the input values from the converter and send configuration data to the peripheral devices via the converter; a plurality of controllers, wherein: the converter is connected in a first path between peripheral devices in the technical automation installation and the central device, and has a predeterminable number of associated peripheral devices, and is designed for cable-based communication with the central device, and for wireless communication with the associated peripheral devices;
each of a plurality of second paths in the technical automation installation including at least one of the plurality of controllers for controlling at least a portion of the peripheral devices and being decoupled from the first path;
at least one of the plurality of second paths including at least one of the plurality of controllers for controlling at least two of the peripheral devices, the plurality of controllers being bypassed by the first path; and
the first path being arranged to provide communication from the converter to the central device for installation management of the technical automation installation and to provide communication from the central device to the converter for configuring at least a portion of the peripheral devices,
wherein at least one of the peripheral devices is connected to the first path and one of the plurality of second paths, the at least one peripheral device being configured to have cable based communication with at least one other peripheral device over the second path and wireless communication with the converter over the first path, and wherein the peripheral devices are field devices.

2. The communication system as claimed in claim 1, wherein the field devices can be configured via a communication link.

3. The communication system as claimed in claim 1, wherein the peripheral devices are input/output assemblies.

4. The communication system as claimed in claim 1, wherein the converter passes input values received from the associated peripheral devices to the central device, and sends output values received from the central device to the associated peripheral devices.

5. The communication system as claimed in claim 1, wherein at least one of the plurality of controllers being bypassed by the first path is configured for communicating information used for installation management with one or more of the peripheral devices.

6. A system for communicating data in a technical automation system having a plurality of peripheral devices, comprising: a first communication path including:
a converter configured to receive input data for configuring the peripheral devices; and
a central device configured to receive the input data from the converter and send configuration data to the peripheral devices via the converter,
wherein communication between the converter and the central device is conducted over a cable-based communication link and communication between the converter and the peripheral devices is conducted over a wireless communication link;
a plurality of second communication paths, each second communication path being decoupled from the first communication path and including:
a controller configured to provide communication between at least one respective peripheral device and the central device over a wired communication link; and
a third communication path including:
the converter, the central device, and the plurality of peripheral devices, wherein at least one of the peripheral devices is connected to the first communication path and one of the plurality of second communication paths, the at least one peripheral device being configured to communicate with at least one other peripheral device over the wired communication link of the second communication path and communicate with the converter over the wireless communication link of the first communication path, and wherein the peripheral devices are field devices.

* * * * *